UNITED STATES PATENT OFFICE 2,487,124

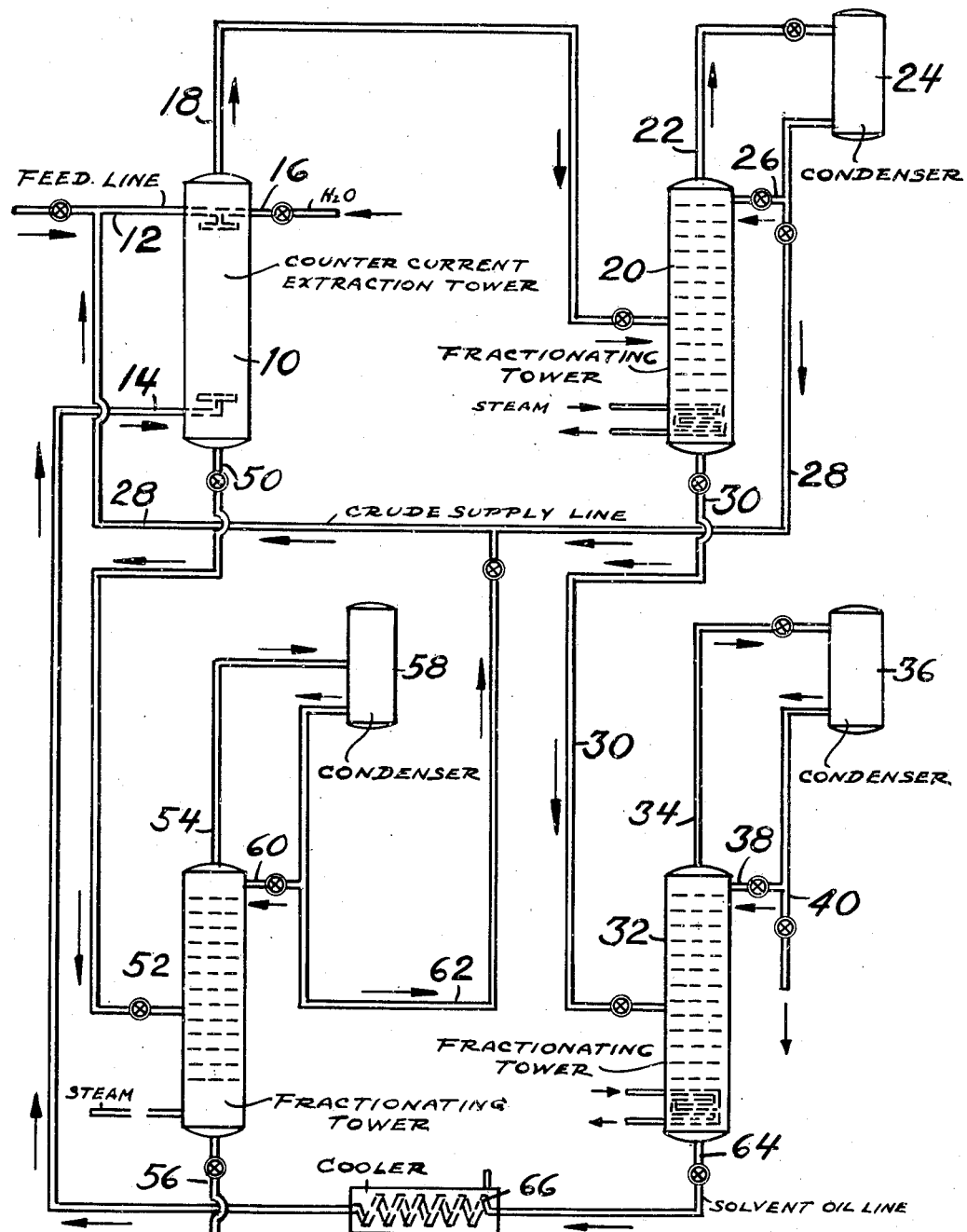

EXTRACTION OF KETONES

Albert Gathman, Elizabeth, and Raymond W. Egberts, Roselle, N. J., assignors to Standard Oil Development Company, a corporation of Delaware Application December 29, 1944, Serial No. 570,450

2 Claims. (Cl. 260—593)

This invention relates to the separation of ketones from industrial solvent mixtures, and in particular to the separation of the lower ketones from recovery systems.

The removal of impurities often presents particular problems in processing for the preparation and recovery of many industrial liquids. A method commonly employed for the purification of organic liquids, especially as to the removal of water, is azeotropic distillation in the presence of added entrainer compounds. Such processing is usually advantageous only when the distillate material contains a low content of the desired liquid and there is thus obtained as distillation residue a high percentage yield of pure liquid. Poor phase separation in the distillate material and contamination of the distillation residue due to difficultly removable impurities often determine the unsuitability of such processing. The present invention is concerned with the purification of ketones from crude mixtures as commonly available involving solvent extraction methods considerably more advantageous than that of azeotropic distillation as presently generally applied.

The separation of ketones from mixtures of alcohols and water is not satisfactorily accomplished by the fractional distillation processes. The unsuitability of distillation procedure is due to the formation of binary and ternary azeotropes by the ketone with the alcohols and water, thus involving low percentage recovery of the desired ketones. The use of entrainers such as hexane and benzene does not contribute to more satisfactory operation on account of the formation of other azeotropic compositions. This invention relates to the use, as extractive media for the ketones, of high boiling hydrocarbons which do not form azeotropic mixtures with any of the constituents of the crude ketone mixtures and thus to obtain the ketone in relatively high degree of purity after the removal of the solvent.

It has been found that when a crude ketone mixture, such as a used solvent mixture from the artificial leather industry, is contacted with a higher boiling hydrocarbon material such as a mineral white oil of viscosity from 1 to 40 centipoises in volumes of fractional portions to about equal volumes, two liquid phases are formed, and that in the upper layer the ketone and mineral oil predominantly occur while the lower layer contains largely water and the difficultly removable water-soluble impurities such as the alcohols. This treatment may be made satisfactorily either by batch operation or in continuous countercurrent manner. The extract solution in either case is subjected to distillation, and the distillate further purified by fractional distillation. In this manner upon a continuous basis, recovery of ketones almost to the extent of 100% has been found to occur from such complex crude ketone mixtures as the recovered solvent of the artificial leather industry. By batch processing, 90% of methyl ethyl ketone has been removed from a mixture containing 66.7% of ketone in ethyl alcohol and water.

The hydrocarbon extractant employed according to the invention is preferably highly paraffinic in character, although naphthene and aromatic hydrocarbons of good chemical stability and boiling range substantially different from the ketone mixture may be advantageously employed. Usually a difference of at least 75° F. from the final boiling point of the ketone mixture is necessary for advantageous processing. Due to their stability, cheapness and availability, mineral white oils are commonly employed.

In order to present a fuller understanding of the invention, the following description is presented. The reference numerals have relation to the accompanying drawing in which a typical flow diagram is presented as to processing carried out according to the invention on a continuous scale.

Into a countercurrent extraction tower 10, the used ketone solvent mixture from the artificial leather industry, containing mainly methyl ethyl ketone, ethyl alcohol and water, was passed under atmospheric conditions through line 12, while a mineral oil of 1.6 centipoises and of boiling range from 403° F. to 500° F. was passed through line 14. To provide for crude mixtures having too low water contents to permit advantageous diphase separation in the tower, water may be added through line 16 as required to supply such deficiency. Through line 18 is thus obtained a stream containing mainly oil and methyl ethyl ketone and minor amounts of ethyl alcohol. This stream is passed to the distillation tower 20. Overhead from the tower 20 through line 22 a stream of composition approximately that of the ternary azeotrope of methyl ethyl ketone, ethyl alcohol and water is obtained and passed to the condenser 24. A portion of the condensate is returned to the tower 20 as reflux through the line 26 while the remainder passes through the line 28 into the crude supply line 12. As distillation residue from the tower 20 is separated, through line 30, a concentrated solution of methyl ethyl ketone in mineral oil solution.

The methyl ethyl ketone solution passing through line 30 is passed to the distillation tower 32 wherein separation is effected of highly purified methyl ethyl ketone from the oil solvent. The ketone is passed through line 34 into the condenser 36 and then partly as reflux through line 38 to the tower 32, while the remainder is passed to storage through line 40.

The residue in the tower 10 consists largely of the water, ethyl alcohol and water-soluble impurities. This material passes through line 50 to the distillation tower 52 wherein separation is made between the small ketone content as a constituent of ternary azeotrope removed overhead through line 54 and the water with small attendant quantities of ethyl alcohol in the higher boiling water-soluble impurities as residual material passed through line 56 to an alcohol recovery system. The overhead stream passes through line 54 to the condenser 58 and thence, partly as reflux through line 60 to the tower 52, and partly through line 62 into the crude feed supply line 12.

From the base of the tower 32 there is obtained solvent oil for recycling through line 64 after cooling in equipment 66 and passage into the oil supply line 14 for the tower 10.

The processing according to the invention is particularly significant in connection with the recovery of ketones from used solvent mixtures of the artificial leather industry. In the preparation of artificial leather, mixtures of solvents, usually ketones, alcohols, acetates and hydrocarbons, are used. After use, the solvent mixture is generally recovered either by absorption on charcoal or by water washing. The distillation of the recovered mixture results in the formation of a ternary blend of, for example, methyl ethyl ketone, ethyl alcohol and water. Similarly, in many manufacturing procedures, ternary mixtures involving the lower ketones as constituents are often obtained. Processing according to this invention is advantageous for the recovery of many industrially important ketones, including acetone, from liquors obtained in the preparation of other compounds and of the used liquids of industrial processes, particularly the artificial leather industry.

What is claimed is:

1. The process of separating the constituents of a crude mixture consisting essentially of methyl ethyl ketone, ethyl alcohol, and water, which comprises countercurrently contacting said crude mixture with a higher boiling petroleum distillate oil having a boiling range from 403° F. to 500° F. in an amount effecting diphase treatment, distilling the substantially oil phase to produce a distillate fraction contain mainly alcohol and water and a residual fraction containing said petroleum distillate oil and methyl ethyl ketone, recycling said distillate fraction to said countercurrent oil contacting and redistilling said residual fraction to recover highly purified methyl ethyl ketone as a distillate fraction.

2. The process of separating methyl ethyl ketone from a crude mixture consisting essentially of methyl ethyl ketone, ethyl alcohol and water, which comprises countercurrently contacting said crude mixture with a petroleum distillate oil composed of higher boiling hydrocarbons having a boiling point at least 75° F. above that of the ketone mixture, which do not form azeotropic mixtures with any of the constituents of said crude mixture and in an amount effecting diphase treatment, distilling from the resulting oil phase the alcohol and water extracted by the oil phase to produce a distillate fraction containing mainly alcohol and water and a residual fraction containing said petroleum distillate oil and methyl ethyl ketone, recycling said distillate fraction to said countercurrent oil contacting, and redistilling said residual fraction to recover highly purified methyl ethyl ketone as a distillate fraction.

ALBERT GATHMAN.
RAYMOND W. EGBERTS.

REFERENCES CITED

The following references are of record in the file of this patent:

UNITED STATES PATENTS

| Number | Name | Date |
|---|---|---|
| 1,524,192 | Mann | Jan. 27, 1925 |
| 2,212,810 | Field | Aug. 27, 1940 |

OTHER REFERENCES

Othmer: Ind. Eng. Chem., 35, pages 798–805 (1943).